United States Patent [19]

Dawley

[11] Patent Number: 4,719,419

[45] Date of Patent: Jan. 12, 1988

[54] APPARATUS FOR DETECTING A ROTARY POSITION OF A SHAFT

[75] Inventor: Douglas J. Dawley, Arlington, Tex.

[73] Assignee: Harris Graphics Corporation, Melbourne, Fla.

[21] Appl. No.: 755,172

[22] Filed: Jul. 15, 1985

[51] Int. Cl.[4] .................. G01B 7/30; H02K 17/42; H01F 7/02

[52] U.S. Cl. .................. 324/208; 310/168; 335/302; 324/262

[58] Field of Search ............ 324/207, 208, 225, 226, 324/228, 234, 235, 236, 239, 260, 261, 262, 173, 174; 338/32 R, 32 H; 310/168–170; 335/302, 306

[56] References Cited

U.S. PATENT DOCUMENTS

| | | | |
|---|---|---|---|
| 3,317,829 | 5/1967 | Kahrt et al. | 324/208 X |
| 3,365,594 | 1/1968 | Davidson | 310/10 |
| 3,366,908 | 1/1968 | Weiss et al. | 338/32 R |
| 3,777,273 | 12/1973 | Baba et al. | 329/200 |
| 3,929,519 | 12/1975 | Benz | 335/306 |
| 4,086,533 | 4/1978 | Ricouard et al. | 324/208 |
| 4,125,821 | 11/1978 | Masuda | 338/32 R |
| 4,204,158 | 5/1980 | Ricouard et al. | 324/208 |
| 4,401,946 | 8/1983 | Klimstra | 324/208 |
| 4,570,118 | 2/1986 | Tomczak et al. | 324/208 |
| 4,614,930 | 9/1986 | Hickey et al. | 335/306 X |

FOREIGN PATENT DOCUMENTS

| | | | |
|---|---|---|---|
| 1225879 | 9/1966 | Fed. Rep. of Germany | 324/208 |
| 1473854 | 2/1969 | Fed. Rep. of Germany | 324/208 |
| 2731661 | 1/1979 | Fed. Rep. of Germany | 338/32 R |
| 2820122 | 11/1979 | Fed. Rep. of Germany | 324/208 |
| 160613 | 12/1981 | Japan | 324/208 |
| 27081 | 2/1982 | Japan | 338/32 H |
| 203913 | 12/1982 | Japan | 324/207 |
| 162813 | 9/1983 | Japan | 324/207 |
| 8201178 | 10/1985 | Netherlands | 324/208 |
| 924714 | 5/1963 | United Kingdom | 324/207 |
| 2123562 | 2/1984 | United Kingdom | 324/208 |
| 2126351 | 3/1984 | United Kingdom | 324/207 |

OTHER PUBLICATIONS

Flaherty et al, "Magnet Configuration for a Hall Sensor Wheel," IBM/TDB, vol. 15, No. 4, Sep. 1972, p. 1254.
"Handbook for Applying Solid State Hall Effect Sensors" Published by Micro Switch, p. III-5, 1976.

Primary Examiner—J. Reinhard Eisenzopf
Assistant Examiner—Warren S. Edmonds
Attorney, Agent, or Firm—Tarolli, Sundheim & Covell

[57] ABSTRACT

A noncontact rotary position sensor for measuring the rotary position of a shaft includes an annular magnetic member mounted for rotation with the shaft and a Hall effect device spaced from the shaft. The annular magnetic member includes a magnetic pole pair radially oriented. The magnetic field produced radially outwardly from the annular magnetic member is monopolar. In one embodiment, the annular magnetic member is circular and produces a magnetic field having a uniform magnetic flux density around its entire circumference at equidistant locations extending radially outwardly of the annular magnetic member and the annular magnetic member is mounted eccentric with respect to the shaft. In another embodiment of the invention, an annular magnetic member is circular and produces a magnetic field having a nonuniform magnetic flux density around the circumference of the member at equidistant locations extending radially outwardly of the annular magnetic member and the annular magnetic member is mounted coaxial with respect to the shaft. As the shaft rotates, the magnetic flux density at the Hall effect device varies.

2 Claims, 6 Drawing Figures

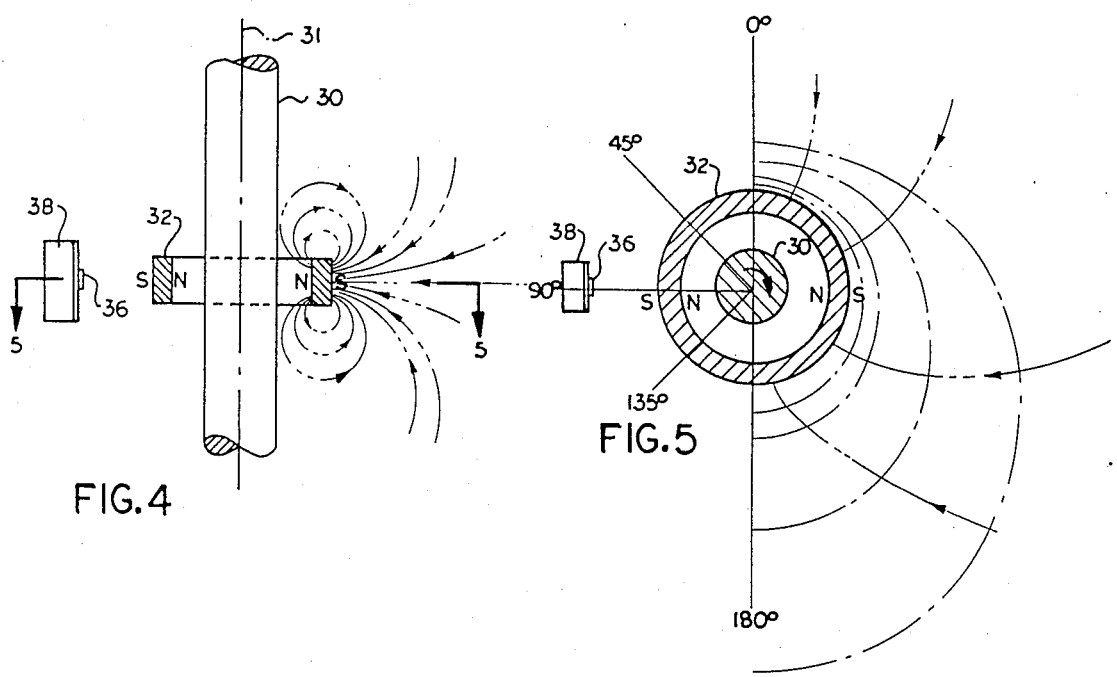
FIG. 4
FIG. 5
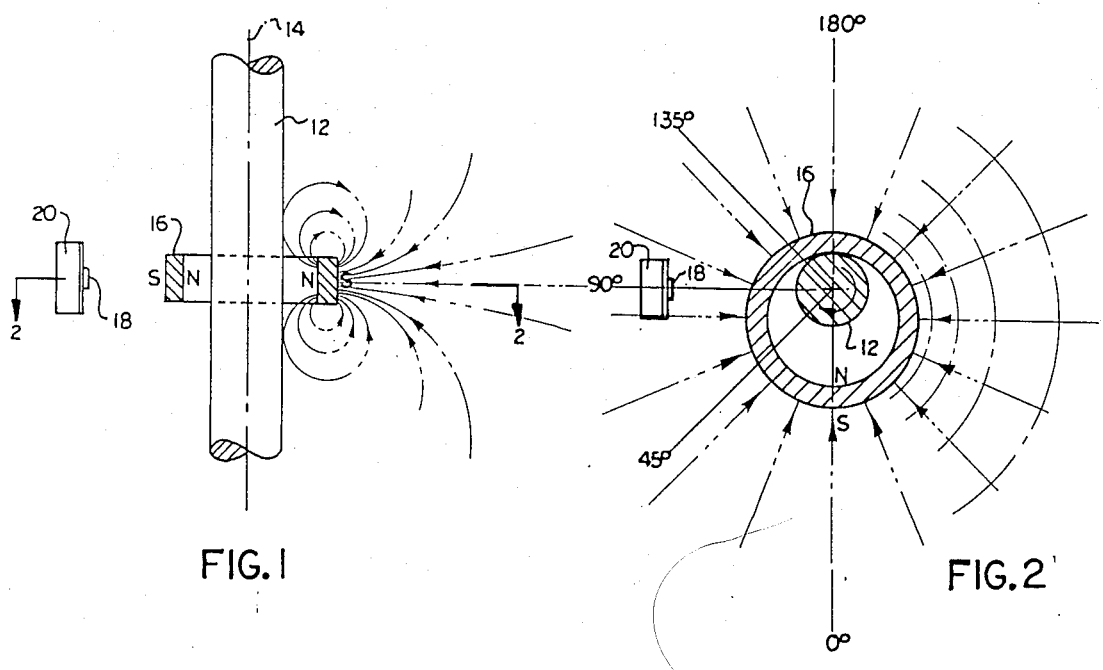
FIG. 1
FIG. 2

APPARATUS FOR DETECTING A ROTARY POSITION OF A SHAFT

TECHNICAL FIELD

The present invention relates to a position sensing apparatus and is particularly directed to a noncontact, rotary position sensing apparatus for sensing the rotary position of a shaft.

BACKGROUND ART

Noncontact rotary position sensing apparatus are known for determining the rotary position of a shaft or the like. Some sensing apparatus employ a Hall effect device in combination with a permanent magnet. The Hall effect device is typically mounted to a stationary member adjacent the shaft. A permanent magnet is mounted to the shaft. The Hall effect device generates a voltage indicative of the relative rotation between the stationary member and the shaft.

One known apparatus utilizes an annular ring magnet having a plurality of circumferentially oriented poles. The ring magnet is coaxially attached to a rotary shaft and a Hall effect device is attached to a stationary member adjacent the ring magnet. In particular, the ring magnet includes a plurality of magnets connected in series to form a ring with the north and south poles of the magnets alternately arranged. As the shaft and the attached ring magnet rotate, the Hall effect device generates a sinusoidal electric signal indicative of the magnetic induction or the magnetic flux density produced by the magnets at the Hall effect device. The polarity of the magnetic flux density and the generated electric signal changes as each pole passes the Hall effect device. The number of signal cycles per revolution of the ring is a function of the number of poles that make up the ring. A counter counts the number of waveform cycles of the signal generated by the Hall effect device. The count is then used to determine the rotary position of the shaft. The accuracy of such a system is dependent upon the number of poles that make up the ring.

Noncontact rotary position sensing apparatus are particularly useful in an ink key control system for metering a fluid fountain in a printing press. To produce high quality printed matter from a printing press, it is essential that ink be consistently delivered in a controlled manner for deposition upon the paper or other stock in the printing operation. Control of the ink film profile across an ink roll requires an accurate means for metering the fluid film.

One ink key adjustment system for controlling the ink film profile on an ink roll is disclosed in co-pending U.S. patent application Ser. No. 629,616 to Kubert et al. The ink key metering apparatus of Kubert et al., includes a plurality of ink keys spaced along a flexible fountain blade. Each ink key has a rotatable shaft that meters a portion of the fountain blade with respect to a fountain roll upon rotation of the shaft. Each ink key shaft has a multipolar ring magnet coaxially mounted thereto. A Hall effect device is mounted to a traveling carriage that is selectively positionable adjacent a ring magnet of a selected ink key. A sinusoidal electrical signal is generated by the Hall effect device as a selected ink key is driven through a drive arrangement and the ring magnet rotates relative to the Hall effect device. The rotational position of the ink key shaft can be determined from the generated signal which is indicative of the relative position between the fountain blade and the fountain roll. The accuracy of such a system is limited by the number of poles that make up the ring magnet.

BRIEF SUMMARY OF THE INVENTION

The present invention relates to an apparatus for sensing the rotary position of a shaft and includes a field measuring device adjacent the shaft for measuring the intensity of the magnetic field which acts thereon and for generating a signal indicative thereof. The apparatus further includes an annular (ring-shaped) member rotatable with the shaft for producing a monopolar magnetic field of different intensities acting on the field measuring device depending on the position of the shaft.

In accordance with one embodiment of the invention an annular magnetic member produces a magnetic field having a uniform, monopolar magnetic flux density around the entire periphery of the member at equidistant locations extending perpendicularly outward of the member. The member is mounted to the rotary shaft with the central axis of the member being eccentric from the central axis of the rotary shaft. As the shaft rotates, the monopolar magnetic flux density at the field measuring device varies.

In accordance with another embodiment of the present invention, an annular magnetic member produces a magnetic field having a nonuniform, monopolar magnetic flux density around the periphery of the member at equidistant locations extending perpendicularly outward of the member. The member is mounted to the shaft with the central axis of the member being coaxial with the axis of the rotary shaft. As the shaft rotates, the monopolar magnetic flux density at the field measuring device varies.

BRIEF DESCRIPTION OF THE DRAWINGS

The foregoing and other objects and advantages of the present invention will become more readily apparent from the following detailed description of preferred embodiments made in conjunction with the accompanying drawings, wherein:

FIG. 1 is a side view of an apparatus made in accordance with the present invention;

FIG. 2 is a view taken along line 2—2 of FIG. 1;

FIG. 4 is a side view of another embodiment of the present invention;

FIG. 5 is a view along line 5—5 of FIG. 4; and

DETAILED DESCRIPTION

Figure 3:
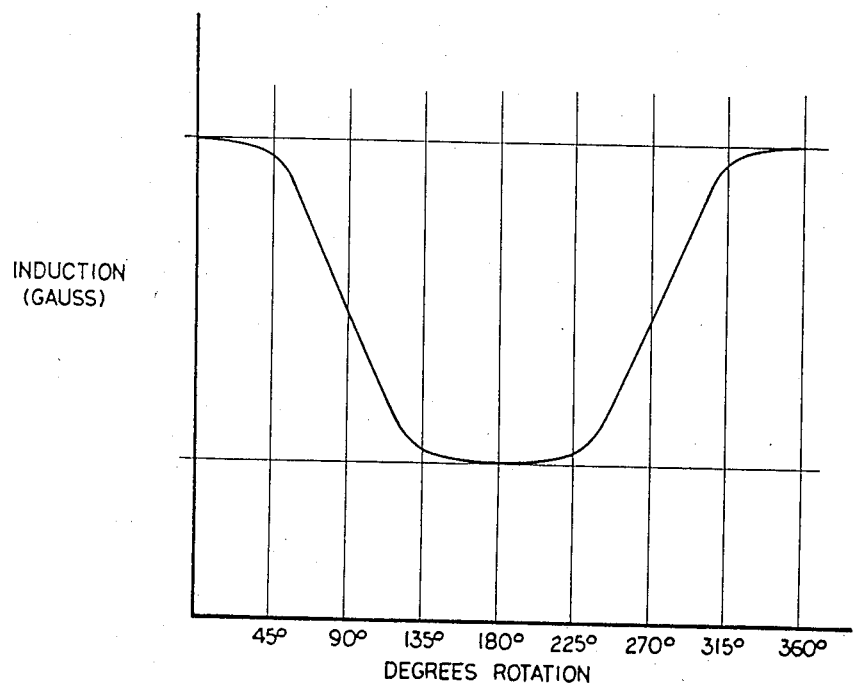
FIG. 3 is a graph depicting induction measured at the field measuring device versus degrees of rotation of the shaft for the embodiment of FIG. 1.

As used in this specification, the term "annular magnetic member" includes any member having a generally circular, ring or elliptical shape and having an inner surface and an outer surface spaced from the inner surface.

Referring to FIGS. 1 and 2, a rotary shaft 12 is mounted for rotation about an axis 14. An annular magnetic member 16 is mounted to the shaft 12. For the purposes of explanation, the member 16 is depicted and described as circular. It is to be understood that the invention is not limited thereto. The central axis of the magnetic member 16 is eccentric from the axis of rotation 14 of the rotary shaft 12.

The magnetic member 16 is made from a ceramic material and has a magnetic pole pair radially oriented. The pole pair is depicted with the N-pole at the inner surface of the member 16 and the S-pole at the outer surface of the member 16. The member 16 is fabricated such that the magnetic flux density or induction it produces is uniform as measured at spaced locations equidistant from the magnetic member 16. Since the magnetic pole pair is radially oriented, the magnetic field density spaced outwardly from the member 16 is of one polarity and the magnetic flux density radially inwardly of the member is of the opposite polarity.

A Hall effect device 18 is spaced from the rotary shaft 12, radially aligned with the member 16 and is mounted to a stationary member 20. The distance between the shaft 12 and the Hall effect device 18 is constant. As the shaft 12 rotates, the distance between the member 16 and the Hall effect device 18 varies. Since the magnetic flux density at the Hall effect device 18 is dependent upon the distance between the Hall effect device and the member 16, the output voltage from the Hall effect device is indicative of the rotary position of shaft 12. The Hall effect device is positioned to measure the magnetic flux density produced outwardly of the member 16. Therefore, the output signal from the Hall effect device is monopolar.

Referring to FIG. 3, a graph is shown depicting the magnetic flux density or induction at the Hall effect device 18 versus the degrees of rotation of the rotary shaft 12. When the shaft is rotated to place the magnetic member 16 closest to the Hall effect device 18, such orientation defines the zero degree position. When the shaft 12 is rotated to position the magnetic member 16 farthest from the Hall effect device 18, such orientation defines the 180° position. Referring to the graph of FIG. 3, the induction is the greatest at the zero (360°) orientation of the rotary shaft 12 and at a minimum when the rotary shaft 12 is in the 180° position. The greatest output signal variance and thereby the greatest measurement sensitivity occurs when the shaft 12 is between the 45° and 135° positions and between the 225° and 315° positions.

Referring now to FIGS. 4 and 5, another embodiment of the present invention is shown including a rotary shaft 30 mounted for rotation about an axis 31 and an annular magnetic member 32 mounted thereto. The central axis of the magnetic member 32 is coaxial with the axis of rotation 31 of the rotary shaft 30. The magnetic member 32 is made from a ceramic material having a magnetic pole pair radially oriented. The magnetic member 32 is preferably circular in shape and produces a magnetic field of nonuniform flux density around the circumference of the member as measured at equidistant spaced locations from the magnetic member. The magnetic member is preferably fabricated to produce a maximum flux density near a first location on the member and to produce a minimum flux density at a location 180° from the first location. A Hall effect device 36 is mounted to a stationary member 38 spaced from the rotary shaft 30. The distance between the shaft 30 and the Hall effect device 36 remains constant. Since the magnetic member 32 is mounted coaxially with the rotary shaft 30, the distance between the Hall effect device 36 and the magnetic member 32 will remain constant as the shaft 30 rotates.

The magnetic flux density produced by the magnetic member 32 is nonuniform as measured at equidistant locations from and around the circumference of the member 32. The amount of flux density or induction measured by the Hall effect device 36 varies as the shaft 30 rotates. When the shaft 30 is rotated to have the magnetic member 32 produce a maximum flux density at the Hall effect device 36, the position is defined as the 0° position. When the shaft is rotated 180°, the magnetic member 32 produces a minimum flux density at the Hall effect device. As the shaft 30 rotates, the amount of induction measured by the Hall effect device 36 is similar to that depicted in the graph of FIG. 3. Since the magnetic pole orientation of the magnetic member 32 is radial, the polarity of the magnetic flux density outwardly of the member 32 and in turn the signal generated by the Hall effect device 36 is monopolar. Maximum signal variance and thereby the maximum measurement sensitivity occurs between the 45° and 135° positions and between the 225° and 315° positions.

It is possible to fabricate the magnetic member in a shape other than circular or to also magnetize the member in a manner other than described above such that maximum measurement sensitivity would occur over a larger degree of angular rotation. The magnetization must still have one magnetic pole on the inner surface and the opposite magnetic pole on the outer surface of the magnetic member. In the two embodiments discussed above, maximum measurement sensitivity occurs over a 90° angle of rotation. These two embodiments are particularly useful when the rotary shaft rotation is confined to a total 90° angle of rotation. One particular use of the invention is with an ink key adjustment device in a printing press.

Figure 6:
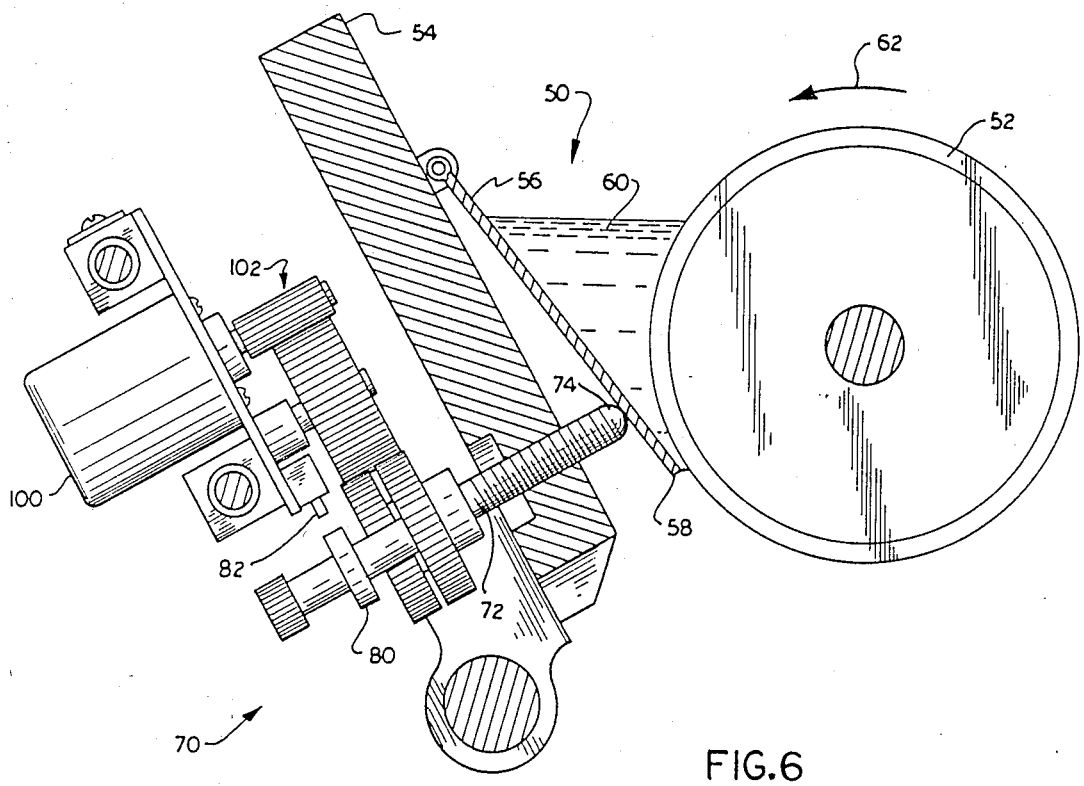
FIG. 6 is an end elevation, partially in section, showing an ink fountain key adjustment device including a position sensor in accordance with the present invention.

Referring to FIG. 6, an ink key control system for metering a fluid fountain in a printing press is shown incorporating the rotary shaft position sensor of the present invention. An ink fountain 50 and associated ink roll 52 extends laterally across the width of a printing press in a conventional manner. The ink fountain comprises a base 54 from which a flexible blade 56 is suspended with its lower edge 58 in close proximity to the ink roll 52. The flexible blade 56 and adjacent curved roll surface forms a cavity which maintains a reservoir 60 of ink. During operation of the press, the ink roll 52 rotates in the direction indicated by the arrow 62 and ink from the reservoir 60 flows through the space between the lower edge 58 of the blade 56 and the roll 52 to create a film of ink upon the surface of the roll whose thickness is determined by the spacing of the blade edge from the roll surface at any point along its length. By precisely controlling the profile of the edge 58 of the flexible blade 56, an ink film having a desired thickness profile can be maintained across the roll.

A plurality of ink key adjustment devices 70 are positioned at locations spaced laterally along the ink fountain 50. Each of the keys includes a shaft 72 threaded through the base 54, with a tip 74 projecting beyond the base to engage and support the rear of the flexible blade 56 adjacent the lower edge 58 thereof. Each section of the lower edge 58 is biased against the associated tip 74. Thus, by rotating the threaded shaft 72 of a selected key, the tip 74 of the selected key may be advanced or retracted as desired to thereby control the spacing between the edge 58 of the associated section of the blade and the adjacent surface of the roll 52.

While the keys may obviously be manually adjusted as required, the U.S. patent application Ser. No. 629,616 to Kubert et al. discloses a device for automatically adjusting the keys to a desired position. To determine the position of the shaft 72 of each key, each key assembly 70 includes an annular magnetic member 80 and a Hall effect device 82. The magnetic member 80 is preferably made in accordance with one of the above described embodiments. The threads on the shaft 72 and the complementary threads in the receiving bore of the base 54 are designed such that a 90° rotation of the shaft 72 will provide the sufficient range of adjustment to vary the distance between the lower edge 58 of the blade 56 and the roll 52 for metering purposes.

The magnetic member 80 is mounted to the shaft 72 to provide a 90° orientation between the member 80 and the Hall effect device 82 when the shaft 72 is rotated to provide a medium profile between the lower edge 58 of blade 56 and the roll 52. When the shaft 72 is rotated ±45° to adjust between a maximum and minimum fluid profile, the measured induction will have the greatest variance and thereby provide maximum measuring sensitivity.

A stepper motor 100 is provided to drive the rotary shaft 72 of a selected key through a gear arrangement 102 as is fully described in the application to Kubert et al.

This invention has been described with reference to preferred embodiments. Modifications and alterations may occur to others upon reading and understanding the specification. It is my intention to include all such modifications and alterations insofar as they come within the scope of the appended claims.

Having described preferred embodiments of the invention, the following is claimed:

1. An apparatus comprising:
   a shaft;
   a ring-shaped magnetic member fixed to the shaft for joint rotation therewith, said ring-shaped magnetic member having a radially oriented magnetic pole pair for producing a monopolar continuous magnetic field having a uniform magnetic flux density around the entire periphery of said ring-shaped magnetic member at spaced equidistant locations extending radially outwardly of said ring-shaped magnetic member; and
   field measuring means supported adjacent said ring-shaped magnetic member radially outwardly thereof for measuring the intensity of said monopolar magnetic field acting on said field measuring means;
   said ring-shaped magnetic member encircling said shaft and being mounted eccentrically of the axis of the shaft so that the intensity of the monopolar magnetic field acting on said field measuring means varies in different rotary positions of the shaft.

2. An apparatus comprising:
   a shaft;
   a ring-shaped magnetic member encircling the shaft and fixed coaxially thereto for joint rotation therewith, said ring-shaped magnetic member producing a monopolar continuous magnetic field having a nonuniform magnetic flux density around the entire periphery of said ring-shaped magnetic member at spaced equidistant locations extending radially outwardly of said ring-shaped magnetic member; and
   field measuring means supported adjacent said ring-shaped magnetic member radially outwardly thereof for measuring the intensity of said monopolar magnetic field acting on said field measuring means in different rotary positions of the shaft.

* * * * *